(12) United States Patent  
Levander et al.

(10) Patent No.: US 7,955,149 B2
(45) Date of Patent: Jun. 7, 2011

(54) FUEL SYSTEM FOR GAS DRIVEN VESSEL

(75) Inventors: Oskar Levander, Turku (FI); Tuomas Sipilä, Turku (FI)

(73) Assignee: Wärtsilä Finland Oy, Vaasa (FI)

( * ) Notice: Subject to any disclaimer, the term of this patent is extended or adjusted under 35 U.S.C. 154(b) by 169 days.

(21) Appl. No.: 12/306,680

(22) PCT Filed: Jun. 1, 2007

(86) PCT No.: PCT/FI2007/050319
§ 371 (c)(1),
(2), (4) Date: Dec. 24, 2008

(87) PCT Pub. No.: WO2008/000898
PCT Pub. Date: Jan. 3, 2008

(65) Prior Publication Data
US 2009/0239426 A1   Sep. 24, 2009

(30) Foreign Application Priority Data

Jun. 27, 2006   (FI) ...................................... 20065445

(51) Int. Cl.
*F02B 61/04*   (2006.01)
*F02M 37/00*   (2006.01)

(52) U.S. Cl. ...................................... 440/88 F

(58) Field of Classification Search ................ 440/88 R, 440/88 F
See application file for complete search history.

(56) References Cited

U.S. PATENT DOCUMENTS

| 2,035,396 | A | | 3/1936 | Mesinger |
|---|---|---|---|---|
| 3,565,201 | A | * | 2/1971 | Petsinger ..................... 180/69.5 |
| 4,106,581 | A | * | 8/1978 | West et al. ................... 180/69.5 |
| 4,175,395 | A | | 11/1979 | Manhes et al. |
| 4,416,638 | A | | 11/1983 | Ellis |
| 4,924,822 | A | | 5/1990 | Asai et al. |
| 6,901,973 | B1 | | 6/2005 | Hall et al. |
| 2006/0086412 | A1 | | 4/2006 | Spittael et al. |

FOREIGN PATENT DOCUMENTS

| EP | 0069717 A1 | 1/1983 |
|---|---|---|
| FR | 2851301 A1 | 8/2004 |
| GB | 306866 A | 2/1929 |
| JP | 9059657 A | 3/1997 |

* cited by examiner

*Primary Examiner* — Daniel V Venne
(74) *Attorney, Agent, or Firm* — Chernoff, Vilhauer, McClung & Stenzel

(57) ABSTRACT

The invention relates to fuel system for gas driven piston engine in a marine vessel, which gas is stored in at least one fuel storage tank in the vessel as liquefied gas. The fuel feeding system comprises a separate fuel feed tank in which the gas is in liquid phase and at elevated pressure. The gas is also in liquid phase in the fuel storage tank, in which, however, prevails only the hydrostatic pressure caused by the liquid gas.

22 Claims, 2 Drawing Sheets

FUEL SYSTEM FOR GAS DRIVEN VESSEL

This is a national stage application filed under 35 USC 371 based on International Application No. PCT/FI2007/050319 filed Jun. 1, 2007, and claims priority under 35 USC 119 of Finnish Patent Application No. 20065445 filed Jun. 27, 2006.

TECHNICAL FIELD

The invention relates to fuel system for gas driven piston engine in a marine vessel, which gas is stored in at least one fuel storage tank in the vessel as liquefied gas according to preamble of claim 1.

BACKGROUND ART

Gas is becoming more and more attractive fuel for ships' prime movers and auxiliary engines. Particularly natural gas (NG) is feasible due to is availability. In ambient circumstances it is a gaseous mixture consisting primarily of methane and small amounts of ethane, propane, butane and nitrogen. It has high hydrogen content relative to coal, so when combusted it provides inter alia low emissions, very clean burning process and it's basically free of contaminants. Particularly in cruise vessels, ferries and ropax vessels, where passengers are on board, the absence of soot emissions and visible smoke in the exhaust of ship's engines is very important feature facilitated by using NG as fuel for the engines. Usually natural gas is stored as liquefied natural gas (LNG) at temperature of −162° C., thus the storage cause problems particularly when the LNG is stored at high pressure, about at 5 bar, which is typically the level that a gas operated piston engine requires. Considering that the tanks must be in that case pressure vessels, which usually are built in cylindrical form, and that the volume of the tanks could be at the magnitude of say 500-1000 m³, arranging large cylindrical tanks in a ship having spaces with basically rectangular cross section creates a lot of wasted space.

An object of the invention is to provide a fuel system for gas driven vessel, which solves the above mentioned and other problems of the prior art.

Object of the invention are met substantially as is disclosed in claim 1. The other claims present more details of different embodiments of the invention.

DISCLOSURE OF THE INVENTION

The basic idea of the invention is to provide separate fuel feed tank in which the gas is in liquid phase and at elevated pressure, and separate fuel storage tank or tanks in which the gas is also in liquid phase but in which prevails the hydrostatic pressure caused by the liquid gas. This way the fuel storage tanks may be constructed simple and economically. Since the liquefied gas is at low temperature the tanks are heat insulated.

The fuel feed tank is a pressure vessel, the fuel feed tank being in connection with the fuel storage tank. There is a first heat exchanger arranged in a fuel feed line which connects a piston engine and the bottom section of the fuel feed tank, the first heat exchanger being adapted for evaporating the liquefied gas prior to feeding to the piston engine. So, only the substantially small fuel feed tank is a pressure vessel, in most cases the volume of the fuel feed tank fuel is less than 30% of the total volume of fuel storage tanks in the vessel.

A first fuel supply line connects the fuel storage tank and the fuel feed tank, and the first fuel supply line is provided with a pump which pumps liquefied gas from the fuel storage tank to the fuel supply tank, the pump being adapted to also raise the pressure of the liquefied gas from about atmospheric pressure in the fuel storage tank to a pressure of about 10 bar, though the nominal operation pressure is typically 3-5 bar. This pressure is determined by the requirements of the piston engines and there is no separate gas compressors needed after the liquefied gas has been evaporate as the fuel feed tank is at suitable pressure.

Since the fuel in the fuel storage tank is not at elevated pressure the fuel storage tank has substantially rectangular walls, which makes it possible to use the available space in the vessel efficiently. The fuel storage tank is arranged to withhold mainly the pressure caused by hydro-static pressure of the liquefied gas.

The fuel feed tank is provided with a pressure build-up system having a circulation duct extending from the bottom section of the fuel feed tank to the upper section of the fuel feed tank and being provided with a second heat exchanger. The pressure build-up system regulates the pressure in the fuel feed tank to be at required level.

In order to minimize the risk of gas leak the first fuel supply line, a second fuel supply line and the fuel feed line are arranged in-side gas-tight outer tube. Further, the at least one fuel storage tank and fuel feed tank are arranged in gas tight compartment(s) and the gas tight outer tube opens into the gas tight compartments forming a gas tight space. In case of a leak inert gas, or other protective medium, may be fed to the space via an inlet for inert gas, which is provided in the gas tight compartments and/or outer tube.

BRIEF DESCRIPTION OF DRAWINGS

In the following the invention will be described with the reference to the accompanying schematic drawing, in which.

DETAILED DESCRIPTION

Figure 1:
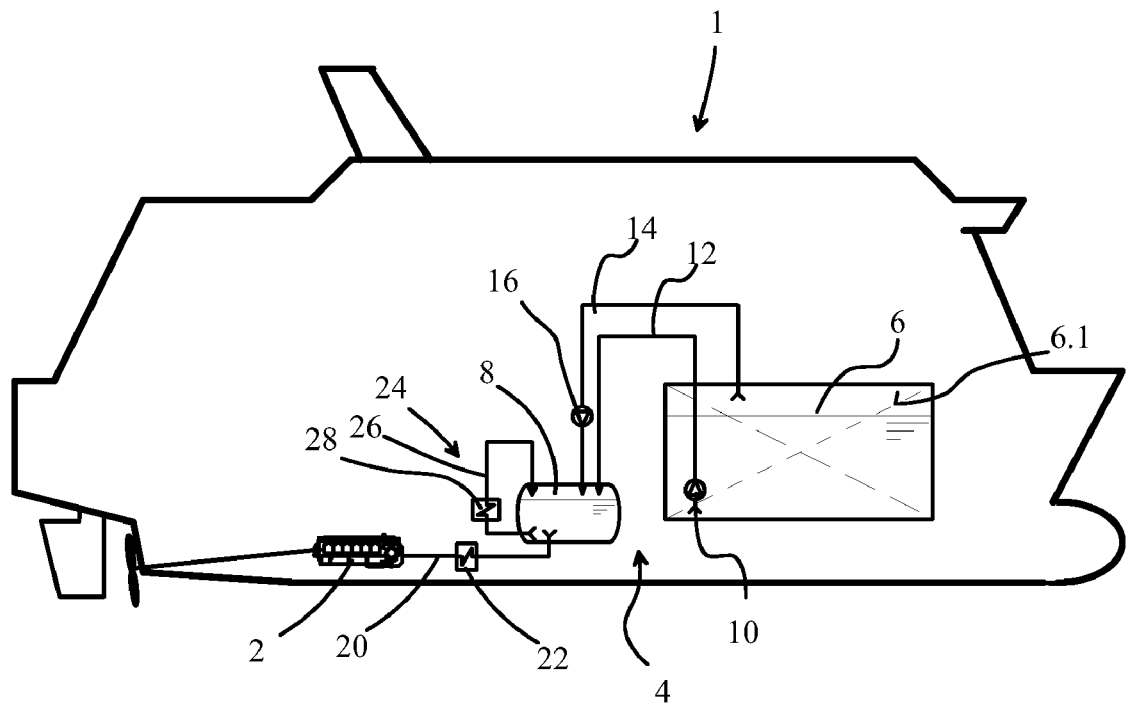
FIG. 1 illustrates a cruise vessel being provided with an embodiment of the fuel feeding system according to the invention.
Figure 2:
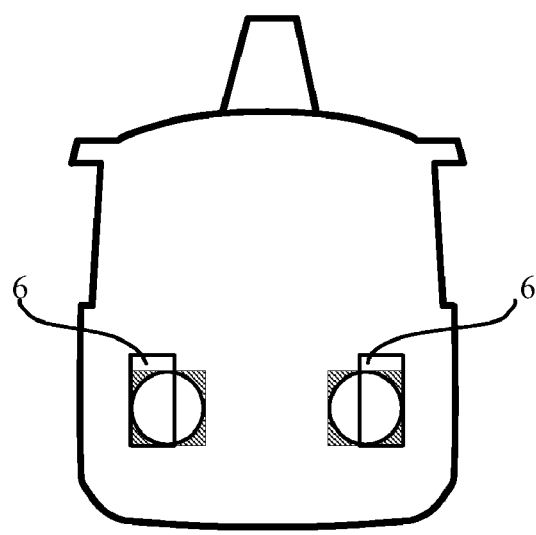
FIG. 2 illustrates longitudinal cross section of the vessel in the FIG. 1.

In FIG. 1 there is very schematically shown a vessel 1, which is a cruise vessel as an example. The vessel is provided with a gas driven piston engine 2. For example natural gas results in very clean exhausts which is environmentally beneficial and also pleasant for the passengers of the vessel due to the fact the exhaust gas has practically no soot or visible smoke. The fuel system 4 for gas driven vessel comprises at least one fuel storage tank 6. The storage tank is heat insulated, because the gas is stored in liquefied form at temperature of about minus 162° C. In order to use the space of the vessel efficiently the storage tanks 6 are constructed of substantially rectangular walls 6.1. The efficient utilization of the space in the vessel can be seen in the FIG. 2. As comparison, the figure also shows a pressure vessel (=cylindrical cross section) of same cross sectional area as the storage tanks 6 and the actual space (shaded square) reserved by the circular shape of a pressure vessel. So, it is clear from the FIG. 2 that the fuel system according to the invention makes the space utilization in the vessel efficient.

In addition to just making use of available space efficiently the fuel storage tanks 6 according to the invention are considerably cheaper to build than pressure vessels.

In the fuel system 4 there is a separate feed tank 8 from which the fuel is fed to the gas driven engines 2. The feed tank is a heat insulated pressure vessel, but it is considerably smaller in volume than the storage tanks 6. Thus the disadvantage of using pressure vessel in fuel system is minimized. The size of the feed tank is dimensioned for about 4 hours consumption at full speed. The size is also determined so that the tanks can maintain pressure even during fast load changes. This is dependent on the engine power. The fuel feed tank 8 is less than 10% of the volume of the storage tanks 6. This way fuel may be delivered to the engines at required pressure but still avoid unnecessary wasting of space. There is a pump 10 provided in a first fuel supply line 12. The first fuel supply line connects the fuel storage tank 6 and the fuel feed tank 8 and it is provided to extend into the bottom section of the fuel storage tank to reach the liquefied gas in the tank. The fuel is pumped from the storage tanks 6 to the feed tank in liquefied form simultaneously raising the pressure to a level higher than that required by piston engines 2 in the vessel, which is typically about 3-5 bar. Contrary to that, the fuel storage tanks 6 are atmospheric, in practise there is mainly the hydrostatic pressure caused by the liquefied gas.

There is also a second fuel supply line 14, which also connects the fuel storage tank 6 and the fuel feed tank 8, but the supply line 14 is provided to extend into the upper section of the fuel storage tank 6 where there is only gaseous gas present. The second fuel supply line 14 is provided for transporting boil off gas from the storage tank 6 to the fuel feed tank 8. Because the fuel storage tank is at lower pressure the second fuel supply line is provided with a compressor unit 16 to raise the pressure of the gas to that prevailing the fuel supply tank 8.

The fuel from the fuel feed tank 8 is led to the engine 2 via a fuel feed line 20. As mentioned, the gas in the fuel feed tank 8 is mainly in liquid phase, so the fuel feed line 20 is provided with an evaporator, a first heat exchanger 22 to evaporate the liquefied gas prior to feeding to the piston engines 2. The fuel feed line extends from the bottom section of the fuel feed tank 8 to the engine, so that it sucks in liquid gas. The fuel feed tank 8 is provided with a pressure build-up system 24 having a circulation duct 26 extending from the bottom section of the fuel feed tank 8 to the upper section of the fuel feed tank and being provided with a second heat exchanger 28.

Figure 3:
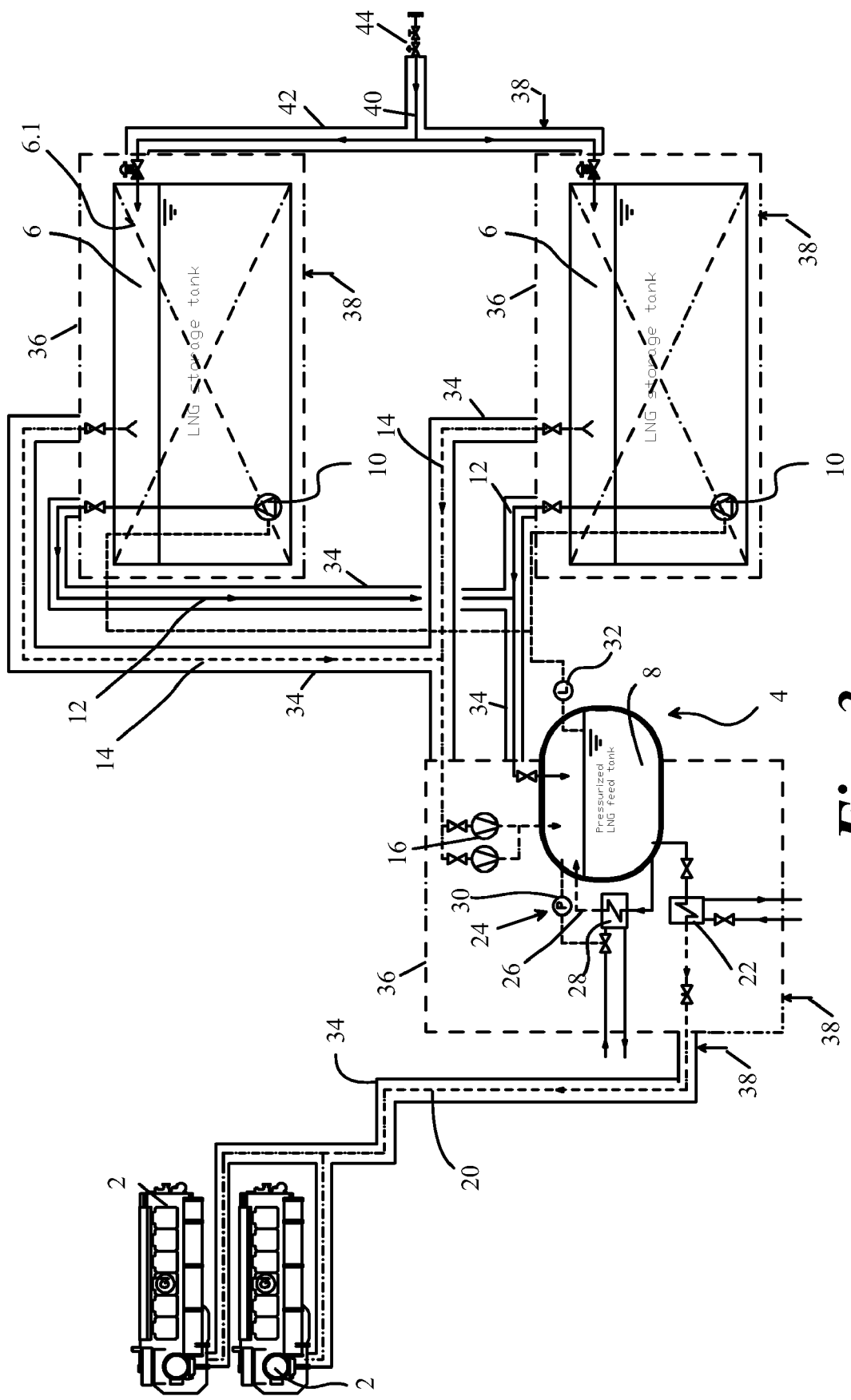
FIG. 3 illustrates an embodiment of the fuel feeding system according to the invention.

In the FIG. 3 there is a more detailed presentation of the fuel feeding system according to the invention using the same reference numbers as far as possible. In FIG. 3 there is shown that the pressure build-up system 24 in fuel feed tank is provided with a pressure sensor 30 which controls the operation of the second heat exchanger 28. When the pressure in the fuel feed tank 8 decreases below a predetermined level the power of the second heat exchanger is increased which increases the evaporation rate of the liquefied gas in the fuel feel tank 8 and increases the pressure to correct level. FIG. 3 also shows that the fuel feed tank is provided with a surface level probe 32 which controls the operation of pumps 10 in the first fuel supply line 12 keeping the amount of liquefied gas in the fuel feed tank at appropriate level.

Another additional feature of the invention is that the first fuel supply line 12, the second fuel supply line 14 and the fuel feed line 20 are provided with a gas tight outer tube 34 which isolates the supply lines from the surroundings. This is a safety measure taken in order to minimize the risk of a gas leak. Also the fuel storage tank 6 and fuel feed tank 8 are arranged in gas tight compartment 36 for the same reason The gas tight outer tubes 34 open into the gas tight compartments forming a gas tight space. The gas tight compartments 36 and the outer tubes 34 comprise an inlet for inert gas 38. In case of a gas leak it is possible to secure the gas tight space by injecting inert gas in to the space.

The fact that the fuel storage tank 6 is not actual pressure vessel and is arranged to have substantially rectangular walls 6.1 makes it also easier to be enclosed in the gas tight compartment because it requires less space than a pressure vessel having circular cross section.

The fuel feeding system is also provided with a bunkering station 44, which is connected with fuel filling lines 40 to each of the fuel storage tanks 6. The fuel filling lines are also provided with outer tube 42.

It is clear that the invention is not limited to the examples mentioned above, e.g. the number of piston engines, fuel storage tanks, fuel feed tanks, etc. may vary, but can be implemented in many other different embodiments within the scope of the inventive idea.

The invention claimed is:

1. A marine vessel including a gas driven piston engine and a fuel system for supplying fuel to the piston engine, the fuel system comprising:
   at least one fuel storage tank for storing liquefied gas,
   a fuel feed tank, wherein the fuel feed tank is a heat insulated pressure vessel for holding the gas in liquid phase and at elevated pressure,
   a first fuel supply line connecting the fuel storage tank and the fuel feed tank,
   a fuel feed line extending from a bottom section of the fuel feed tank to the piston engine, the first fuel feed line being provided with a first heat exchanger for evaporating liquid gas from the fuel feed tank prior to feeding it to the piston engine, and
   a pressure build-up system for regulating pressure in the fuel feed tank, the pressure build-up system comprising a circulation duct extending from the bottom section of the fuel feed tank to an upper section of the fuel feed tank, the circulation duct being provided with a second heat exchanger.

2. Fuel system for a gas driven piston engine in a marine vessel, comprising:
   at least one fuel storage tank in the marine vessel for storing liquefied gas,
   a separate fuel feed tank, wherein the fuel feed tank comprises a heat insulated pressure vessel containing gas in liquid phase and at elevated pressure,
   a first fuel supply line connecting the fuel storage tank and the fuel feed tank,
   a fuel feed line extending from a bottom section of the fuel feed tank to the piston engine,
   a first heat exchanger for supplying heat to gas in the fuel feed line whereby liquid gas from the fuel feed tank is evaporated prior to feeding it to the piston engine, and
   a pressure build-up system for regulating pressure in the fuel feed tank, the pressure build-up system comprising a circulation duct that extends from the bottom section of the fuel feed tank to an upper section of the fuel feed tank and is provided with a second heat exchanger.

3. Fuel system according to claim 2, wherein the fuel feed tank fuel has a total volume that is less than 30% that of the fuel storage tanks in the marine vessel.

4. Fuel system according to claim 2, wherein the first fuel supply line is provided with a pump, which pumps liquefied gas from the fuel storage tank at about atmospheric pressure and supplies the liquefied gas to the fuel feed tank at a pressure of about 10 bar.

5. Fuel system according to claim 2, wherein the fuel storage tank has substantially rectangular walls.

6. Fuel system according to claim 5, wherein the fuel storage tank withstands mainly the pressure caused by hydrostatic pressure of the liquefied gas in the fuel storage tank.

7. Fuel system according to claim 2, wherein the first fuel supply line is arranged inside a gas tight outer tube.

8. Fuel system according to claim 7, wherein the fuel storage tank and fuel feed tank are arranged in respective gas tight compartments, and the gas tight outer tube opens into the gas tight compartments forming a gas tight space.

9. Fuel system according to claim 8, wherein at least one element of the group selected from the gas tight compartments and the gas tight outer tube is provided with an inlet for inert gas.

10. Fuel system according to claim 2, wherein the first supply line is arranged inside a first gas tight outer tube, the fuel feed line is arranged inside a second gas tight outer tube, the fuel feed tank is arranged inside a gas tight compartment, and the first and second gas tight outer tubes open into the gas tight compartment forming a gas tight space.

11. Fuel system according to claim 2, wherein the first fuel supply line extends from a bottom section of the fuel storage tank to the fuel feed tank, the system comprises a second fuel supply line extending from an upper section of the fuel storage tank to the fuel feed tank, and the first and second fuel supply lines are arranged inside first and second gas tight outer tubes respectively.

12. Fuel system according to claim 11, wherein the fuel storage tank and the fuel feed tank are arranged in respective gas tight compartments, and the first and second gas tight outer tubes each open into the gas tight compartments forming a gas tight space.

13. Marine vessel according to claim 1, wherein the fuel feed tank fuel has a total volume that is less than 30% that of the fuel storage tanks in the marine vessel.

14. Marine vessel according to claim 1, wherein the first fuel supply line is provided with a pump, which pumps liquefied gas from the fuel storage tank at about atmospheric pressure and supplies the liquefied gas to the fuel feed tank at a pressure of about 10 bar.

15. Marine vessel according to claim 1, wherein the fuel storage tank has substantially rectangular walls.

16. Marine vessel according to claim 15, wherein the fuel storage tank withstands mainly the pressure caused by hydrostatic pressure of the liquefied gas in the fuel storage tank.

17. Marine vessel according to claim 1, wherein the first fuel supply line is arranged inside a gas tight outer tube.

18. Marine vessel according to claim 17, wherein the fuel storage tank and fuel feed tank are arranged in respective gas tight compartments, and the gas tight outer tube opens into the gas tight compartments forming a gas tight space.

19. Marine vessel according to claim 18, wherein at least one element of the group selected from the gas tight compartments and the gas tight outer tube is provided with an inlet for inert gas.

20. Marine vessel according to claim 1, wherein the first supply line is arranged inside a first gas tight outer tube, the fuel feed line is arranged inside a second gas tight outer tube, the fuel feed tank is arranged inside a gas tight compartment, and the first and second gas tight outer tubes open into the gas tight compartment forming a gas tight space.

21. Marine vessel according to claim 1, wherein the first fuel supply line extends from a bottom section of the fuel storage tank to the fuel feed tank, the system comprises a second fuel supply line extending from an upper section of the fuel storage tank to the fuel feed tank, and the first and second fuel supply lines are arranged inside first and second gas tight outer tubes respectively.

22. Marine vessel according to claim 21, wherein the fuel storage tank and the fuel feed tank are arranged in respective gas tight compartments, and the first and second gas tight outer tubes each open into the gas tight compartments forming a gas tight space.

* * * * *